(12) United States Patent
Sagoo et al.

(10) Patent No.: US 7,411,388 B2
(45) Date of Patent: Aug. 12, 2008

(54) ROTARY POSITION SENSOR AND METHOD FOR DETERMINING A POSITION OF A ROTATING BODY

(75) Inventors: Bahadur Sagoo, Houston, TX (US); Borislav Tchakarov, Humble, TX (US); Quan Phan, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 126 days.

(21) Appl. No.: 11/214,709

(22) Filed: Aug. 30, 2005

(65) Prior Publication Data

US 2007/0046126 A1    Mar. 1, 2007

(51) Int. Cl.
   *G01B 7/30* (2006.01)
(52) U.S. Cl. .............. 324/207.25; 324/207.15
(58) Field of Classification Search ................
                324/207.12–207.25, 173–174
   See application file for complete search history.

(56) References Cited

U.S. PATENT DOCUMENTS

| | | | | |
|---|---|---|---|---|
| 3,381,216 A | * | 4/1968 | Sibley, Jr. et al. | 324/207.15 |
| 3,600,617 A | * | 8/1971 | Frayer | 310/156.71 |
| 3,688,306 A | * | 8/1972 | Oishi et al. | 341/15 |
| 3,731,533 A | * | 5/1973 | Geery | 73/861.78 |
| 3,732,449 A | * | 5/1973 | Oishi et al. | 310/259 |
| 3,805,161 A | * | 4/1974 | Bayha et al. | 324/161 |
| 4,008,432 A | * | 2/1977 | Sugisaki et al. | 324/207.16 |
| 4,199,718 A | * | 4/1980 | Ikeda et al. | 324/772 |
| 4,259,637 A | * | 3/1981 | Bloomfield et al. | 324/166 |
| 4,280,569 A | | 7/1981 | Mount, II | 175/26 |
| 4,354,558 A | | 10/1982 | Jageler et al. | 175/45 |
| 4,438,398 A | * | 3/1984 | Maruo et al. | 324/173 |
| 4,455,516 A | * | 6/1984 | Furusho | 318/254 |
| 4,609,055 A | | 9/1986 | Grafstrom et al. | 173/162 H |

(Continued)

FOREIGN PATENT DOCUMENTS

GB    2409219 A    6/2005

OTHER PUBLICATIONS

International Search Report for International Application No. PCT/US06/33696. Mailed Dec. 18, 2008.

(Continued)

*Primary Examiner*—Jay M Patidar
(74) *Attorney, Agent, or Firm*—Cantor Colburn LLP

(57) ABSTRACT

A variable reluctance position sensor and a method for determining a position of a rotating body are provided. The variable reluctance position sensor includes a rotatable member configured to be operably coupled to the rotating body. The rotatable member has a first non-magnetic body portion and a plurality of magnets disposed equidistant from one another around an exterior region of the first non-magnetic body portion. The variable reluctance position sensor further includes a stator assembly having a second non-magnetic body portion with an aperture extending therethrough for receiving the rotatable member therein. The stator assembly further includes a plurality of coils and a plurality of coil brackets. Each coil of the plurality of coils is attached to a respective coil bracket of the plurality of coil brackets. The plurality of coil brackets are fixedly attached equidistant from one another to the second non-magnetic body portion. Rotation of the rotatable member induces the plurality of coils to generate voltage signals indicative of a position of the rotatable member.

19 Claims, 8 Drawing Sheets

U.S. PATENT DOCUMENTS

| | | | |
|---|---|---|---|
| 4,646,011 A * | 2/1987 | Wallrafen | 324/207.25 |
| 4,679,636 A | 7/1987 | Ruhle | 175/58 |
| 4,702,168 A | 10/1987 | Colle, Jr. et al. | 102/313 |
| 4,714,119 A | 12/1987 | Hebert et al. | 175/20 |
| 4,743,786 A * | 5/1988 | Ichikawa et al. | 310/111 |
| 4,924,180 A * | 5/1990 | Nasr et al. | 324/207.15 |
| 4,983,915 A * | 1/1991 | Rossi | 324/207.17 |
| 5,032,750 A * | 7/1991 | Hayashi | 310/83 |
| 5,138,968 A * | 8/1992 | Ohike | 116/294 |
| 5,233,253 A * | 8/1993 | Nishio et al. | 310/254 |
| 5,310,013 A | 5/1994 | Kishino et al. | 175/44 |
| 5,411,106 A | 5/1995 | Maissa | 175/78 |
| 5,439,065 A | 8/1995 | Georgi | 175/59 |
| 5,487,433 A | 1/1996 | Mackay et al. | 175/78 |
| 5,617,927 A | 4/1997 | Maissa | 175/78 |
| 5,667,025 A | 9/1997 | Haessly et al. | 175/78 |
| 5,982,169 A * | 11/1999 | Furlani et al. | 324/207.2 |
| 6,084,400 A * | 7/2000 | Steinich et al. | 324/207.13 |
| 6,097,126 A * | 8/2000 | Takura | 310/166 |
| 6,107,772 A | 8/2000 | Liu | 318/701 |
| 6,186,248 B1 | 2/2001 | Silay | 175/27 |
| 6,371,221 B1 | 4/2002 | Harrigan | 175/26 |
| 6,427,534 B2 * | 8/2002 | D'Amico et al. | 73/520.01 |
| 6,672,407 B2 | 1/2004 | Streich | 175/58 |
| 6,729,416 B2 | 5/2004 | Contreras et al. | 175/20 |
| 6,940,269 B2 * | 9/2005 | Komura | 324/146 |
| 7,112,956 B2 * | 9/2006 | Shibata et al. | 324/207.25 |
| 2005/0212366 A1 * | 9/2005 | Yoshiyama et al. | 310/68 B |

OTHER PUBLICATIONS

PCT Written Opinion of the International Searching Authority for international Application No. PCT/US06/33696. Mailed Dec. 18, 2008.

* cited by examiner

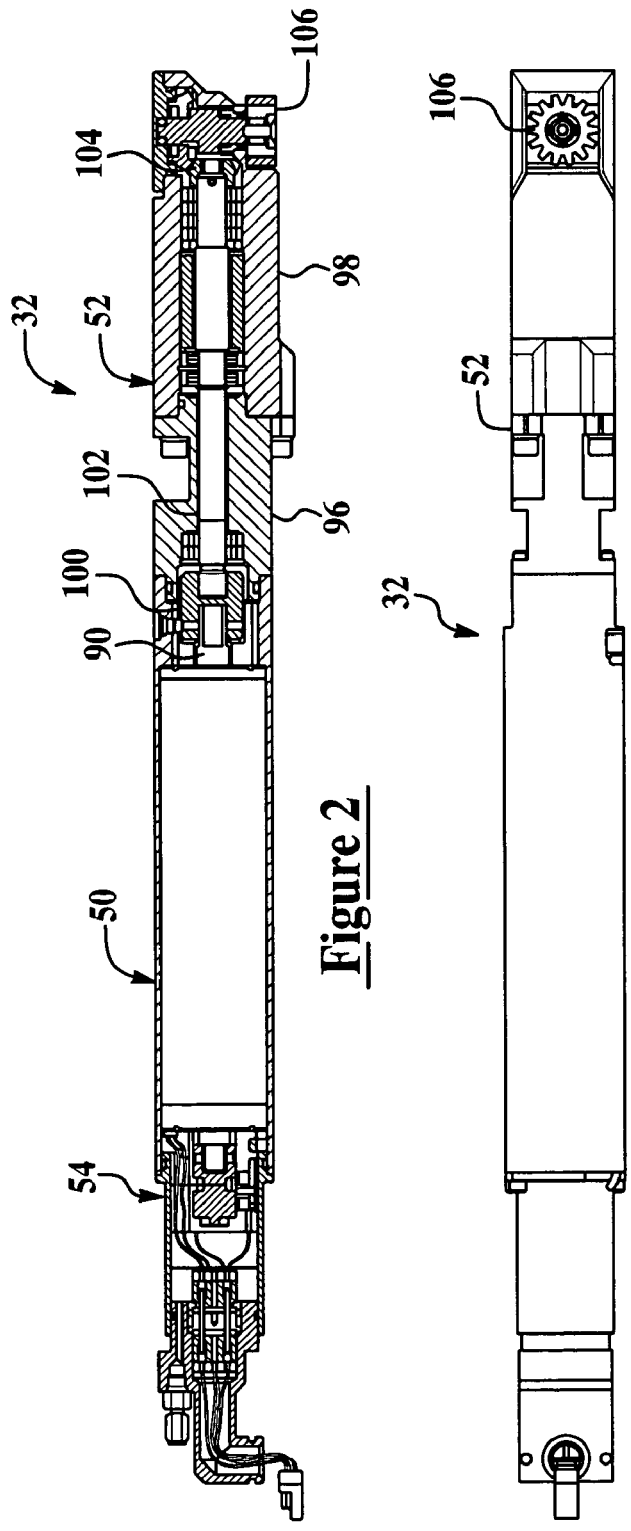
Figure 2
Figure 3
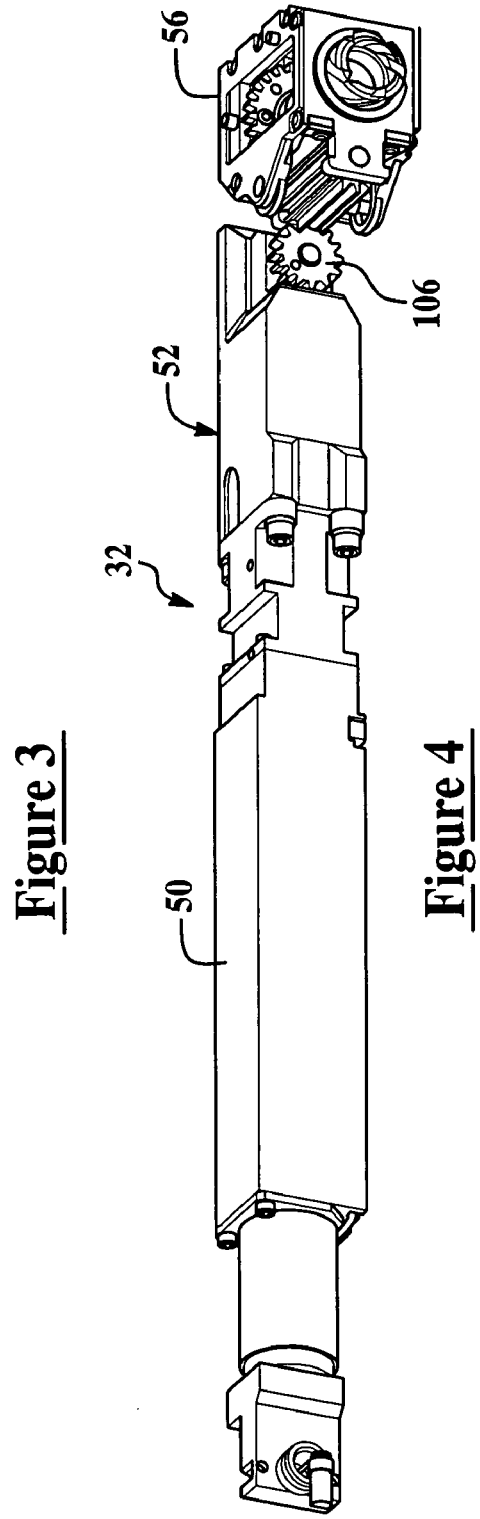
Figure 4

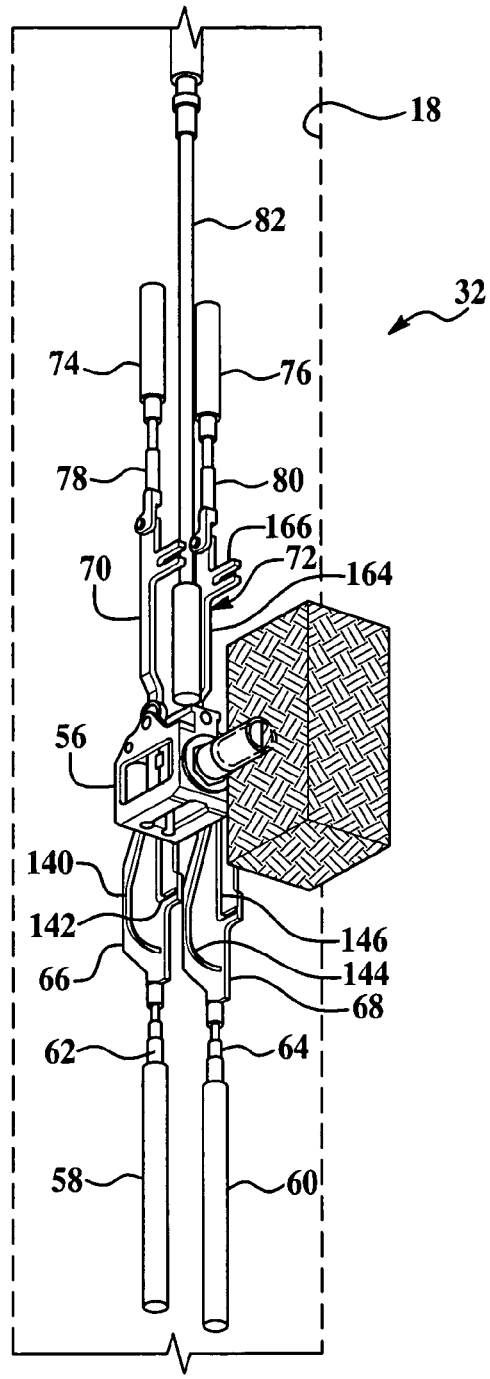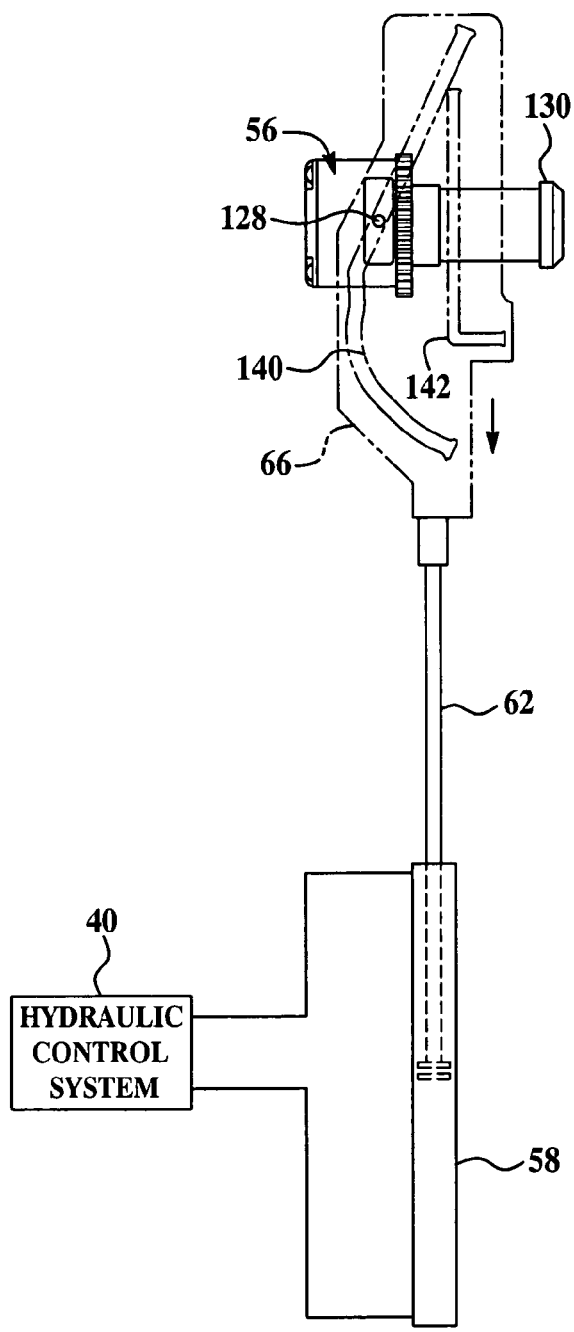
Figure 5
Figure 6

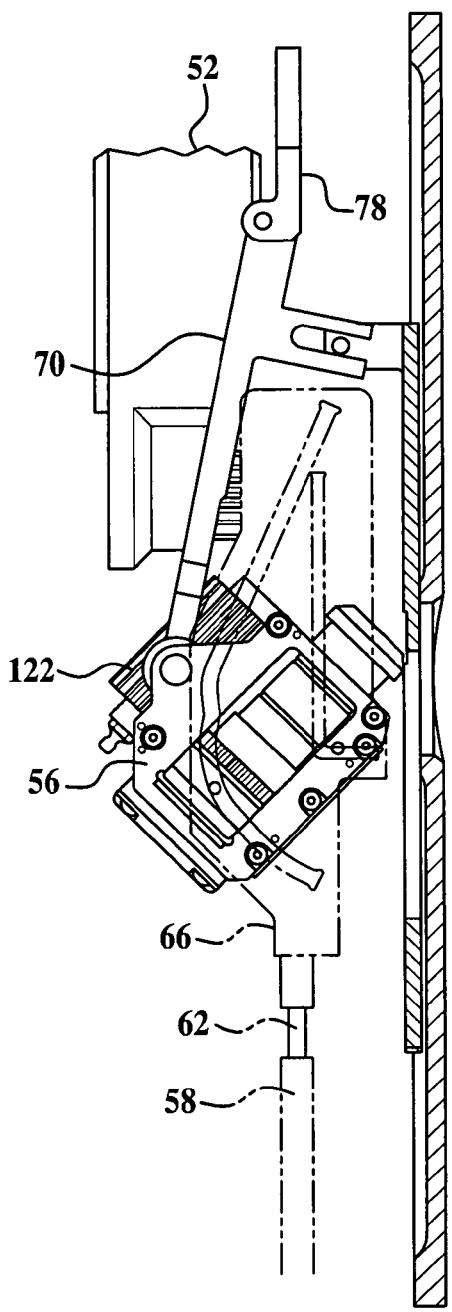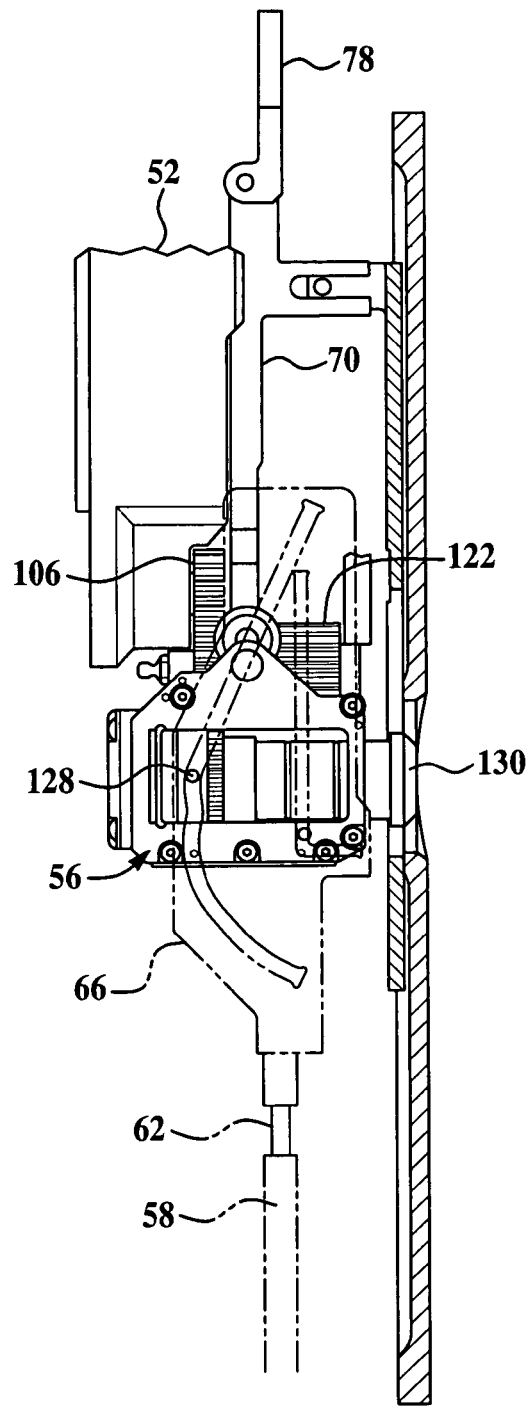
Figure 9
Figure 10

ROTARY POSITION SENSOR AND METHOD FOR DETERMINING A POSITION OF A ROTATING BODY

TECHNICAL FIELD

The present application relates to a variable reluctance position sensor and a method for determining a position of a rotating body utilizing the sensor.

BACKGROUND

Hall Effect sensors have been developed to detect a rotational position of a motor. A problem associated with Hall Effect sensors, is that when the Hall Effect sensors are utilized in operating environments with a relatively high operating temperature (e.g., 350° F.), the output signals from the sensors can become degraded.

Further, position measuring circuits that measure the back emf voltage in motor coils to determine a rotational position of a motor have been developed. A problem associated with these circuits that are electrically coupled to the motor, is that at relatively high operating temperatures, the circuits output signals having a relatively low signal-to-noise ratio which may not provide an accurate indication of the rotational position of the motor.

Accordingly, the inventors herein have recognized a need for an improved position sensor that is electrically isolated from a motor that can generate signals indicative of a rotational position of the motor.

SUMMARY

A variable reluctance position sensor for sensing a position of a rotating body in accordance with an exemplary embodiment is provided. The variable reluctance position sensor includes a rotatable member configured to be operably coupled to the rotating body. The rotatable member has a first non-magnetic body portion and a plurality of magnets disposed equidistant from one another around an exterior region of the first non-magnetic body portion. The variable reluctance position sensor further includes a stator assembly having a second non-magnetic body portion with an aperture extending therethrough for receiving the rotatable member therein. The stator assembly further includes a plurality of coils and a plurality of coil brackets. Each coil of the plurality of coils is attached to a respective coil bracket of the plurality of coil brackets. The plurality of coil brackets are fixedly attached equidistant from one another to the second non-magnetic body portion. Rotation of the rotatable member induces the plurality of coils to generate voltage signals indicative of a position of the rotatable member.

A method for determining a position of a rotating body utilizing a variable reluctance position sensor in accordance with another exemplary embodiment is provided. The variable reluctance position sensor comprises a rotatable member configured to be operably coupled to a rotating body. The rotatable member has a first non-magnetic body portion and a plurality of magnets disposed equidistant from one another around an exterior region of the first non-magnetic body portion. The variable reluctance position sensor further comprises a stator assembly having a second non-magnetic body portion with an aperture extending therethrough for receiving the rotatable member therein. The stator assembly further includes a plurality of coils and a plurality of coil brackets. Each coil of the plurality of coils is attached to a respective coil bracket of the plurality of coil brackets. The plurality of coil brackets are fixedly attached equidistant from one another to the second non-magnetic body portion. The method includes rotating the rotatable member of the variable reluctance position sensor in response to rotation of the rotating member coupled to rotatable member, wherein the plurality of magnets on the rotatable member are rotated past the plurality of coils of the stator assembly of the variable reluctance position sensor to induce the plurality of coils to generate voltage signals. The method further includes measuring the generated voltage signals to determine the position of the rotatable member utilizing a controller.

BRIEF DESCRIPTION OF THE DRAWINGS

FIG. 2 is a cross-sectional view of a portion of the rotary coring device utilized in the coring apparatus of FIG. 1;

FIG. 3 is a side view of a portion of the rotary coring device utilized in the coring apparatus of FIG. 1;

FIG. 4 is an isometric view of a portion of a rotary coring device utilized in the coring apparatus of FIG. 1;

FIG. 5 is a schematic of the rotary coring device disposed in a wellbore;

FIG. 6 is a schematic of a hydraulic control system and hydraulic actuators for moving a coring tool of the rotary coring device to a desired position within a wellbore;

FIG. 9 is a side view of the portion of the rotary coring device in a second operational position within the wellbore;

FIG. 10 is a side view of the portion of the rotary coring device in a third operational position within the wellbore;

DETAILED DESCRIPTION OF EXEMPLARY EMBODIMENTS

Figure 1:
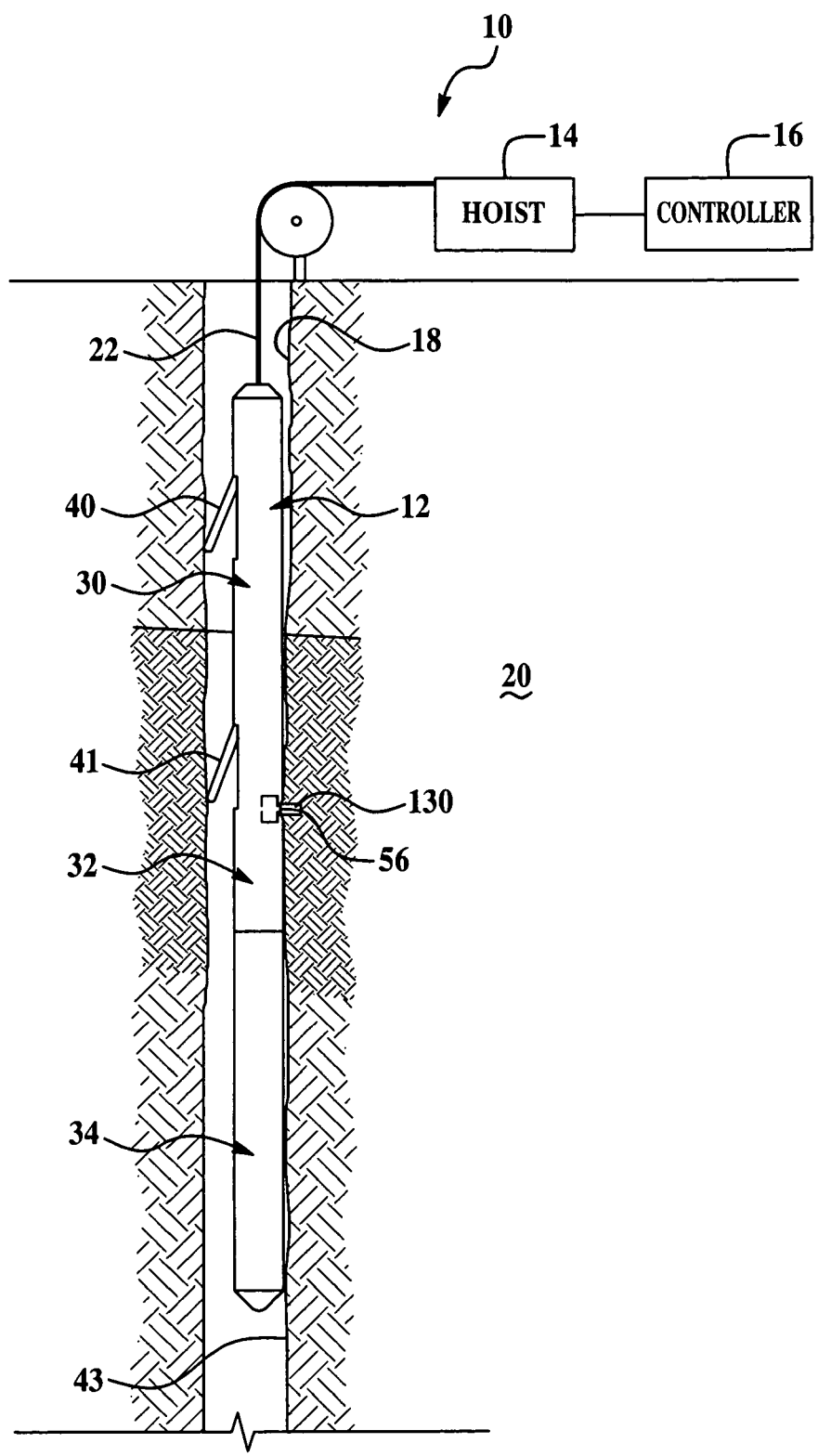
FIG. 1 is a block diagram of a core extraction system having a coring apparatus for obtaining a sidewall core from an earth formation, in accordance with an exemplary embodiment.

Referring to FIG. 1, a core extraction system 10 for obtaining a sidewall core from an earth formation 20 adjacent a wellbore is provided. The core extraction 10 includes a coring apparatus 12, a hoist 14, and a controller 16.

The coring apparatus 12 is disposed at selected depths within the wellbore 18 of the earth formation 20 via a wireline 22 coupled to the hoist 14. The coring apparatus 12 is configured to acquire at least one sidewall core of a portion of the earth formation proximate the wellbore 18 at a predetermined depth. The coring apparatus 12 includes an electro-hydraulic section 30, a rotary coring device 32, and a core receptacle section 34.

The electro-hydraulic section 30 is provided to house electrical components and circuits for controlling the extension and retraction of locking arms 40, 41 in response to control signals from the controller 16. In particular, the electro-hydraulic section 30 extends the locking arms 40, 41 in an outwardly direction to move the coring apparatus 12 adjacent a wall of the wellbore 18 for obtaining a sidewall core. Alternately, the electro-hydraulic section 30 retracts the locking arms 40, 41 to move the coring apparatus 12 away from the wall. The electro-hydraulic section 30 further includes a hydraulic control system 40, which will be described in further detail below.

Referring to FIGS. 1-5, the rotary coring device 32 is provided to acquire sidewall cores from the earth formation 20. The rotary coring device 32 includes an electrical motor 50, a transmission assembly 52, a position sensing system 54, a coring tool 56, hydraulic actuators 58, 60, shafts 62, 64, guide plates 66, 68, pivot arms 70, 72, hydraulic actuators 74, 76, connecting arms 78, 80, and a core ejecting shaft 82.

Referring to FIG. 2, the electrical motor 50 is provided to drive a gear assembly in the coring tool 56 for rotating a rotary coring bit 130 at one of a plurality of rotational speeds. In an exemplary embodiment, the electrical motor 50 comprises a DC electrical motor. It should be noted, however, that in other exemplary embodiments, the electrical motor 50 can comprise any other motor known to those skilled in the art, such as a variable reluctance motor or a switched reluctance motor for example. The electrical motor 50 includes a stator (not shown) and a rotor 90 that rotates at one of a plurality of rotational speeds, in response to commutation signals from the controller 16. For example, the controller 16 can generate commutation signals for inducing the electrical motor 50 to rotate at a first predetermined rotational speed in response to a predetermined parameter of the earth formation 20 at a first predetermined depth. Further for example, the controller 16 can generate commutation signals for inducing electrical motor 50 to rotate at a second predetermined rotational speed greater than the first predetermined speed, in response to a predetermined parameter of the earth formation 20 at a second predetermined depth. As shown, the electrical motor 50 is operably coupled to the transmission assembly 52. In particular, the rotor 90 of the motor 50 is operably coupled to a connecting member 100 of the transmission assembly 52.

Referring to FIGS. 2 and 4, the transmission assembly 50 is provided to transfer torque from the motor 52 to a gear assembly in the coring tool 56. The transmission assembly 52 includes housing portions 96, 98, a coupling member 100, a drive shaft 102, a bevel gear 104, and a pinion gear 106. The housing portions 96, 98 are operably coupled together and define an interior region for enclosing the remaining components of the transmission assembly 52. The coupling member 100 is operably coupled at first end to the rotor 90 of the motor 50. Further, the coupling member 100 is operably coupled at a second end to a first end of the drive shaft 102. A second end of the drive shaft 102 is fixedly attached to the bevel gear 104. Thus, rotation of both the rotor 90 induces rotation of the drive shaft 102 and the bevel gear 104. The bevel gear 104 is operably coupled to the pinion gear 106. Thus, rotation of the bevel gear 100 induces rotation of the pinion gear 106.

Figure 7:
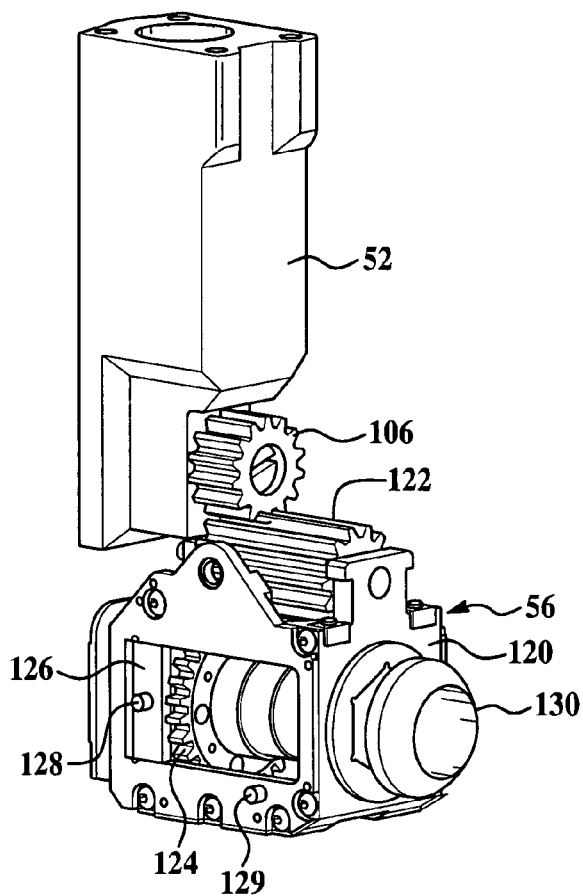
FIG. 7 is an isometric view of the coring tool utilized in the rotary coring device.

Referring to FIGS. 4 and 7, the coring tool 56 is provided for extracting a sidewall core from the earth formation 20. The coring tool 56 includes a housing 120, a gear assembly comprising a gear 122 and a gear 124, a movable plate 126, a pair of guide pins 128 (one being shown), a pair of guide pins 129 (one being shown), and a rotary coring bit 130. The housing 120 defines an interior region for holding the gear 122, the gear 124, and the movable plate 126. When the coring tool 56 is moved to an operational position where the pinion gear 106 of the transmission assembly 52 engages the gear 122, rotation of the pinion gear 106 induces rotation of the gear 122. Further, rotation of the gear 122 induces rotation of the gear 124 and the rotary coring bit 130. The movable plate 128 is movable along an axial direction of the rotary coring bit 130. The guide pins 128 are disposed on opposite sides of the movable plate 128 and are provided for the guiding movement of the rotary coring bit 130 in a linear direction (either outwardly or inwardly with respect to the housing 120) as will be explained in further detail below. The guide pins 129 are disposed on opposite sides of the housing 120 and are also provided for guiding movement of the rotary coring bit 130 in a linear direction (either outwardly or inwardly with respect to the housing 120) as will be explained in further detail below.

Referring to FIG. 5, as discussed above, the rotary coring device 32 includes hydraulic actuators 58, 60. The hydraulic actuators 58, 60 are provided to move the coring tool 56 to desired operational positions within the wellbore 18. The hydraulic actuators 58, 60 are configured to extend and retract piston shafts 62, 64, respectively. The shafts 62, 64 are further coupled to the guide plates 66, 68, respectively.

Referring to FIGS. 5 and 7, the guide plates 66, 68 are provided to guide movement of the coring tool 56. The guide plate 66 includes cam slots 140, 142 extending therethrough. The cam slots 140, 142 are provided receive therein guide pins 128, 129 on a first side of the coring tool 56. The guide plate 68 includes cam slots 144, 146 extending therethrough. The cam slots 144, 146 are provided to receive therein guide pins 128, 129 on a second side of the coring tool 56.

Figure 8:
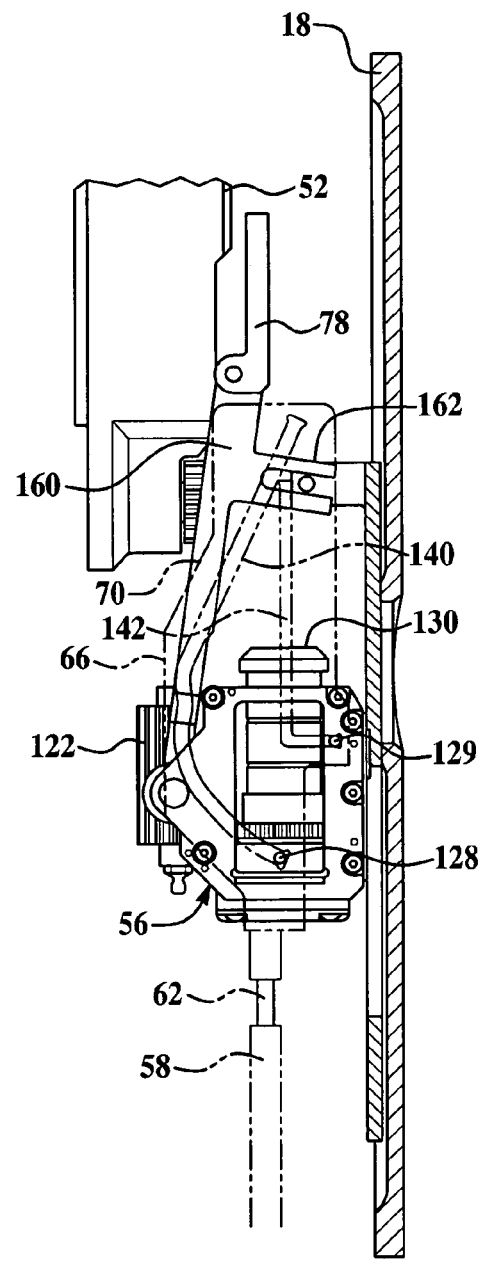
FIG. 8 is a side view of a portion of the rotary coring device in a first operational position within the wellbore.
Figure 11:
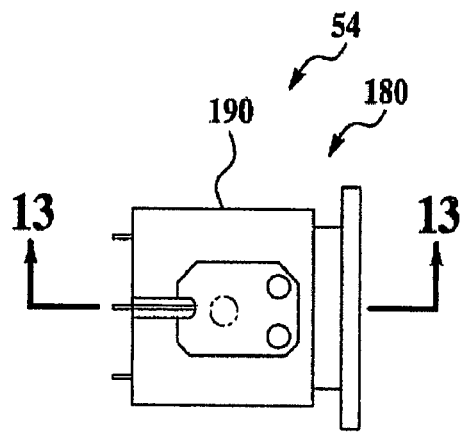
FIG. 11 is a side view of the variable reluctance position sensor utilized in the rotary coring device, in accordance with an exemplary embodiment.
Figure 12:
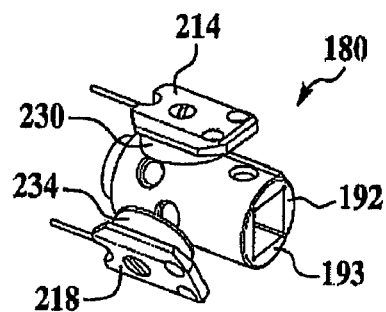
FIG. 12 is an isometric view of a rotor utilized in the variable reluctance position sensor of FIG. 11.
Figure 13:
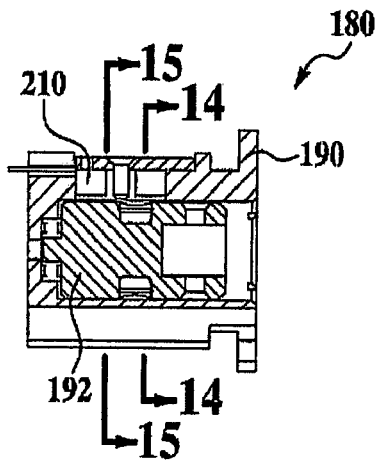
FIG. 13 is a cross-sectional view of the variable reluctance position sensor of FIG. 11.
Figure 14:
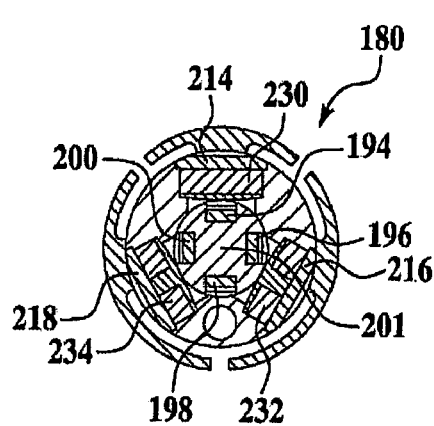
FIG. 14 is a cross-sectional view of the variable reluctance position sensor of FIG. 13 taken along lines 14-14.
Figure 15:
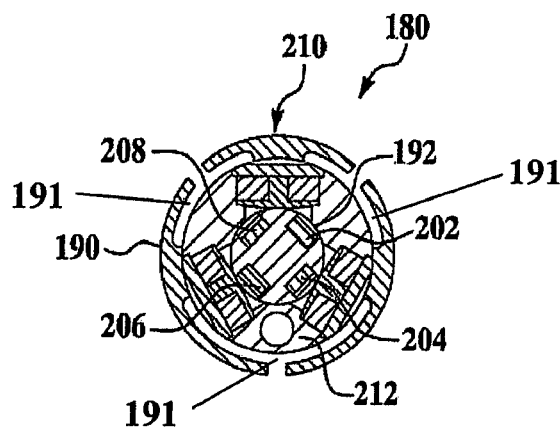
FIG. 15 is a cross-sectional view of the variable reluctance position sensor of FIG. 13 taken along lines 15-15.

Referring to FIGS. 5 and 8, the remaining components of the rotary coring device 32 will now be explained. The pivot arms 70, 72 are operably coupled to the housing 120 of the coring tool 56. The pivot arm 70 has an elongated portion 160 and a U-shaped portion 162. The elongated portion 160 is connected at a first end to the housing 120. The elongated portion 160 is connected at a second end to the connecting arm 78. The U-shaped portion 162 extends outwardly from the elongated portion 160 and is configured to allow movement of the pivot arm 70 relative to a stationary pin. The pivot arm 72 has an elongated portion 164 and a U-shaped portion 166. The elongated portion 164 is connected at a first end to the housing 120. The elongated portion 164 is connected at a second end to the connecting arm 80. The U-shaped portion 166 extends outwardly from the elongated portion 164 and is configured to allow movement of the pivot arm 72 relative to a stationary pin. The hydraulic actuators 74, 76 are operably coupled to the connecting arms 78, 84 respectively, controlling movement of the coring tool 56. In particular, hydraulic actuators 74, 76 retract or extend the connecting arms 78, 80, respectively, to move the coring tool 56. The core injecting shaft 82 is utilized to contact a sidewall core contained within the coring tool 56 for ejecting the core from the coring tool 56 into the core receptacle section 34 when the coring tool 56 is disposed in an upright position in the wellbore 18 as shown in FIG. 8.

Referring to FIG. 8, positioning of the coring tool 56 for acquiring a sidewall core will now be explained. Initially, as shown, the coring tool 56 is disposed beneath the transmission assembly 52 in the wellbore 18. Referring to FIGS. 6 and 9, thereafter, the controller 16 outputs command signals to the hydraulic control system 40. The command signals induce the hydraulic control system 42 to induce the hydraulic actuators 58, 60 to urge the guide plates 66, 68, respectively, upwardly which causes the rotary coring tool 56 to rotate such that the rotary coring bit 130 is moved outwardly from the housing 120 of the coring tool 56. In particular, the guide pins 128, 129 on a first side of the rotary coring tool 56 move within the cam slots 140, 142. Concurrently, the guide pins 128, 129 on a second side of the rotary coring tool 56 move within the cam slots 144, 146 on the guide plate 68. Referring to FIG. 10, when the hydraulic actuators 58, 60 urge the guide plates 66, 66 to a predetermined extended position, the gear 106 of the transmission assembly 52 is operably coupled to the gear 122 of the coring tool 56, for transmitting torque to the gear 122. Further, the guide pins 128 attached to the movable plate 126 urge the movable plate 126 outwardly (rightwardly in FIG. 10) such that the rotary coring bit 130 contacts a portion of the earth formation 20. Thereafter, the controller 16 generates commutation signals to induce the motor 50 to rotate the rotary coring bit 130 for acquiring a sidewall core.

Referring to FIGS. 13-16, the position sensing system 54 is provided to generate position signals indicative of a rotational position of the rotor 90 of the motor 50. The signals generated by the position sensing system 54 are received by the controller 16 and the controller 16 generates commutation signals for controlling operation of the motor 50, in response to the position signals. The position sensing system 54 includes the variable reluctance position sensor 180 and the amplifier circuit 182.

Referring to FIGS. 11-15, the variable reluctance position sensor 180 is configured to be mechanically coupled to the rotor 90 of the motor 50 for generating voltage signals indicative of a position of the rotor 90. An advantage of the variable reluctance position sensor 180 is that the sensor is not electrically coupled to the motor 50, thus eliminating electrical noise generated by the motor 50, from position signals generated by the sensor 180. A further advantage of the variable reluctance position sensor 180 is that the sensor 180 can generate accurate position signals when operating at relatively high temperatures. The variable reluctance position sensor 180 includes a housing 190, a rotor 192, magnets 194, 196, 198, 200, 202, 204, 206, 208, and a stator assembly 210.

The housing 190 is provided to enclose the remaining components of the variable reluctance position sensor 180. The housing 190 is constructed from a non-magnetic material, such as aluminum for example. Referring to the embodiment of FIG. 15, the housing 190 includes a plurality of alignment grooves 191 extending from an exterior surface of the housing 190 inwardly into the housing 190 for positioning the housing 190.

The rotor 192 is positioned within an aperture defined by the stator assembly 210. The rotor 192 is generally cylindrical-shaped and is constructed from a non-magnetic material, such as plastic for example. The rotor 192 includes a first plurality of apertures extending from an outer surface of the rotor 192 inwardly into the rotor 192, for receiving magnets 194, 196, 198, and 200 therein. The magnets 194, 196, 198, and 200 are disposed at positions 90° apart from one another about an axis 201, at a first predetermined axial position along the rotor 192. The rotor 192 includes a second plurality of apertures extending from the outer surface of the rotor 192 inwardly into the rotor 192, for receiving magnets 202, 204, 206, 208 therein. The magnets 202, 204, 206, 208 are disposed at positions 90° apart from one another about the axis 201, at a second predetermined axial position along the rotor 192. The magnets 202, 204, 206, 208 are offset 45 degrees from magnets 194, 196, 198, and 200 about the axis 201. The rotor 192 further includes an aperture 193 extending from a first end of the rotor 192 inwardly into the rotor 192 a predetermined distance. The aperture 193 is configured to receive an end of the rotor 90 of the motor 50 for fixedly coupling the rotor 192 to the rotor 90. Thus, the rotor 192 rotates at a substantially similar speed as the rotor 90 of the motor 50. Further, the magnets may comprise rare-earth magnets.

The stator assembly 210 includes a non-magnetic body portion 212, coil brackets 214, 216, 218 and coils 230, 232, 234. The non-magnetic body portion 212 is generally ring-shaped and has an aperture extending therethrough with a diameter larger than an outer diameter of the rotor 192. In other words, a small air gap is defined between an outer surface of the rotor 192 and inner surface defined by the non-magnetic body portion 212. The coil brackets 214, 216, 218 are provided to fixedly hold the coils 230, 232, 234, respectively thereon. The coil brackets 214, 216, 218 are configured to be disposed in apertures extending into an exterior surface of the non-magnetic body portion 212. The coil brackets 214, 216, 218 are disposed at positions 120° apart from one another about the axis 201. Further, the coil brackets 214, 216, 218 are constructed from carbon steel for concentrating magnetic flux from the rotor magnets around the coils 230, 232, 234, respectively.

The operation of the variable reluctance position sensor 180 will now be explained. The sensor 180 utilizes an interaction between electromagnetic fields generated by the magnets on the rotor 192 and electrical currents generated in the coils 230, 232, 234 in response to the electromagnetic fields moving past the coils 230, 232, 234 when the rotor 192 is rotating. Faraday's Law of electromagnetic induction, states that a voltage (i.e., an electromagnetic force EMF) is induced in a conductor such as a coil, when magnetic flux lines are at a right angle with respect to the conductor. Thus, in particular, when a magnet moves past a coil having a length (L), a number of turns (N) and a cross-sectional area (A)—at a velocity (w) radians per second, and the magnetic field (B) generated by the magnet moves at a right angle uniformly past the conductor, a voltage (E) is induced in the coil that is described by the following equation:

$$E = BNLAw\, \sin(wt)$$

Further, because the coils 230, 232, 234 are displaced from each other by 120°, the voltages (Ea), (Eb), (Ec) generated in the coils 230, 232, 234, respectively by rotation of the magnets on the rotor 192 are described by the following equations:

$$Ea = BNLAw\, \sin(wt)$$

$$Eb = BNLAw\, \sin(wt - 120°)$$

$$Ec = BNLAw\, \sin(wt - 240°).$$

Figure 17:
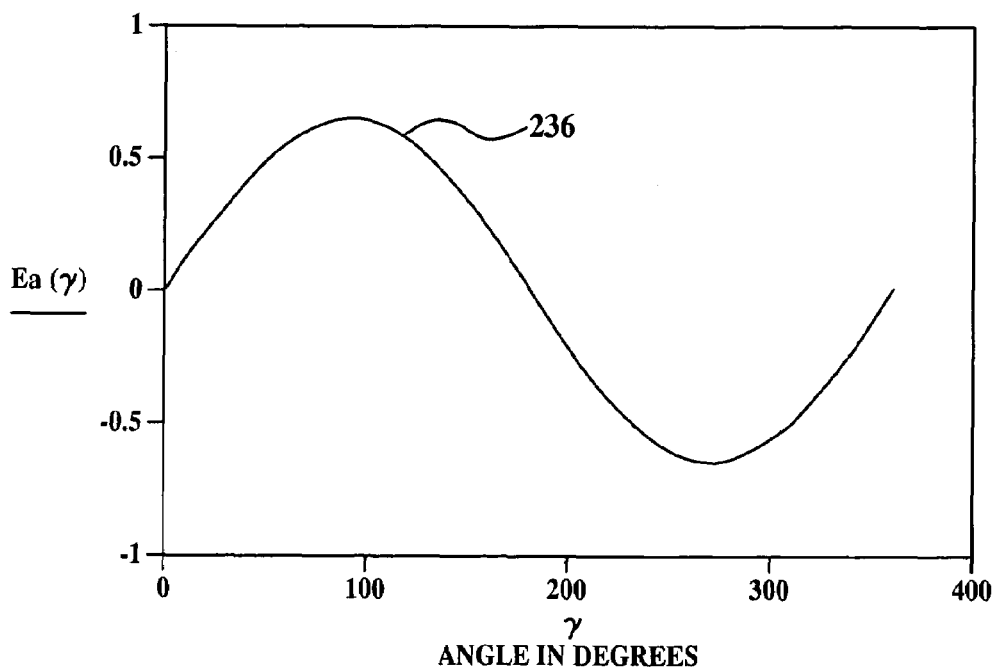
FIGS. 17-19 are schematics of position signals generated by the variable reluctance position sensor of FIG. 11.
Figure 18:
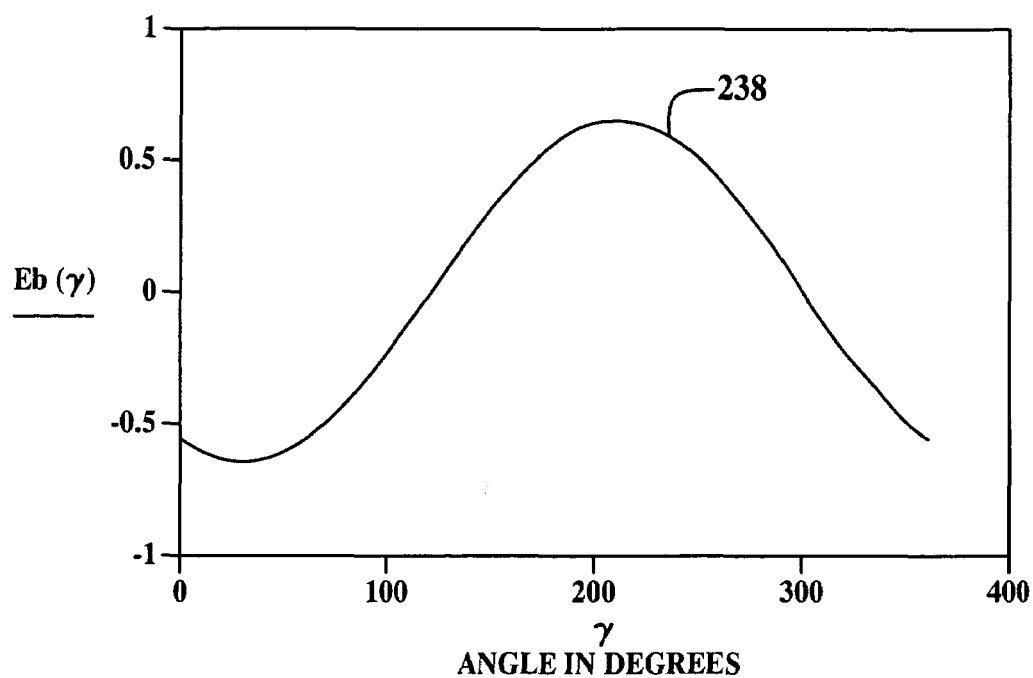
Figure 19:
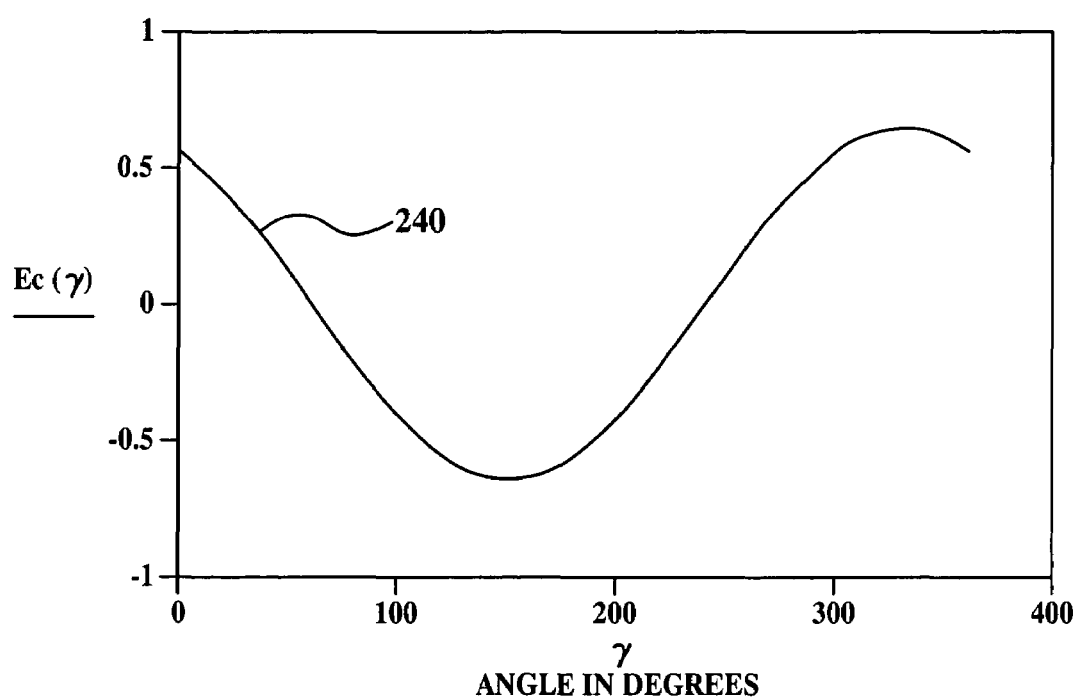

Referring to FIG. 17, an exemplary voltage waveform 236 representing the voltage (Ea) generated by the coil 230 over time is illustrated. Further, referring to FIG. 18, an exemplary voltage waveform 238 representing the voltage (Eb) generated by the coil 232 over time is illustrated. Further, referring to FIG. 19, an exemplary voltage waveform 240 representing the voltage (Ec) generated by the coil 234 over time is illustrated.

The relationship between the electrical position and the mechanical position of the rotor 192 of the variable reluctance position sensor 180 is determined utilizing the following equation:

$$\theta e = (Pr/2) * \theta m$$

where:

θe corresponds to an electrical degree position of the rotor 192 for magnetic orientation;

θm corresponds to a mechanical degree position of the rotor 192; and

Pr corresponds to a number of magnets on the rotor 192.

The relationship between the mechanical and electrical speeds of the rotor 192 is determined utilizing the following equation:

$$\omega e = Pr/2 * \omega m$$

where:

ωe corresponds to an electrical speed in radians per seconds (or RPM) of the rotor 192;

ωm corresponds to a mechanical speed in radians per second (or RPM) of the rotor 192.

Figure 16:
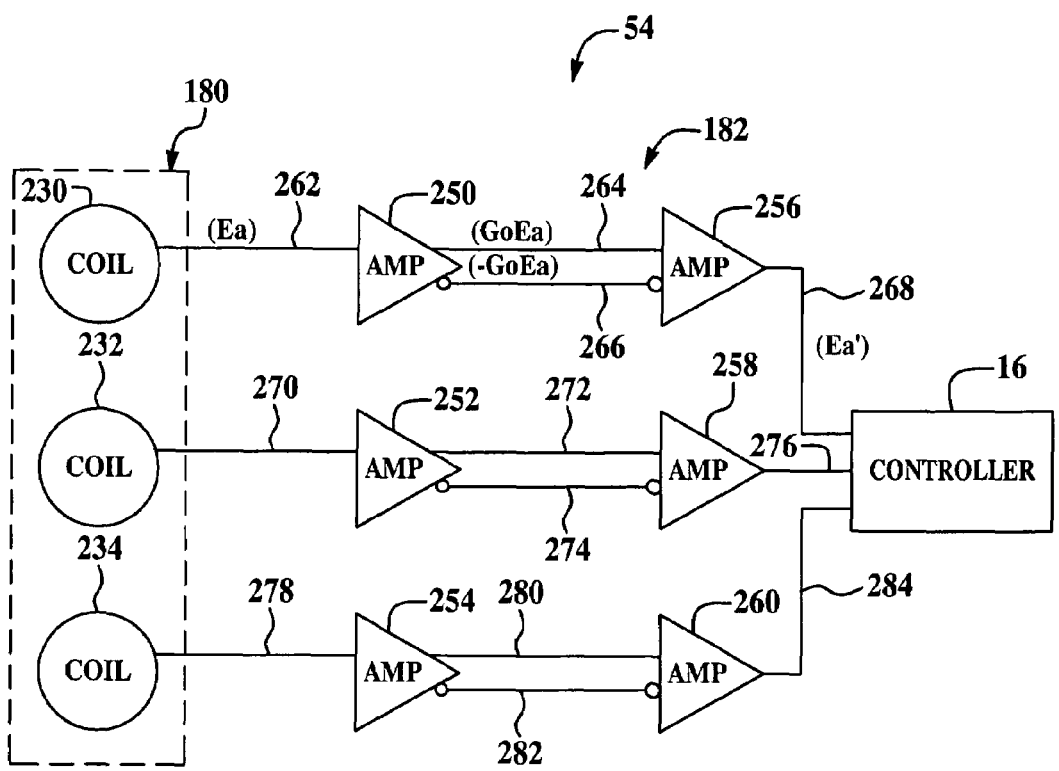
FIG. 16 is an electrical schematic of a position sensing system utilized in the core extraction system of FIG. 1.

Referring to FIG. 16, the amplifier circuit 182 for amplifying and filtering out noise in the voltages (Ea), (Eb), and (Ec) is illustrated. The amplifier circuit 182 includes differential amplifiers 250, 252, 254, noise cancellation amplifiers 256, 258, 260, and conductors 262, 264, 266, 268, 270, 272, 274, 276, 278, 280, 282, and 284.

The coil 230 is electrically coupled to an input terminal of the amplifier 250 via the conductor 262. The amplifier 250 has first and second output terminals electrically coupled to first and second terminals of the amplifier 256 via the conductors 264, 266, respectively. An output terminal of the amplifier 256 is electrically coupled to the controller 16 via the conductor 268. During operation, the amplifier 250 receives the voltage (Ea) from the coil 230 and outputs an amplified voltage (G*Ea) on the conductor 264 and an amplified voltage (−G*Ea) on the conductor 266, where G corresponds to a predetermined voltage gain. The noise cancellation amplifier 256 outputs the voltage (Ea'), having less electrical noise than voltage (Ea), in response to receiving the voltages (G*Ea) and (−G*Ea). The voltage (Ea') which is indicative of the position of the rotor 90 is received by the controller 16.

The coil 232 is electrically coupled to an input terminal of the amplifier 252 via the conductor 270. The amplifier 252 has first and second output terminals electrically coupled to first and second terminals of the amplifier 258 via the conductors 272, 274, respectively. An output terminal of the amplifier 258 is electrically coupled to the controller 16 via the conductor 276. During operation, the amplifier 252 receives the voltage (Eb) from the coil 232 and outputs an amplified voltage (G*Eb) on the conductor 272 and an amplified voltage (−G*Eb) on the conductor 274, where G corresponds to the predetermined voltage gain. The noise cancellation amplifier 258 outputs the voltage (Eb'), having less electrical noise than voltage (Eb), in response to receiving the voltages (G*Eb) and (−G*Eb). The voltage (Eb') which is also indicative of the position of the rotor 90 is received by the controller 16.

The coil 234 is electrically coupled to an input terminal of the amplifier 254 via the conductor 278. The amplifier 254 has first and second output terminals electrically coupled to first and second terminals of the amplifier 260 via the conductors 280, 282, respectively. An output terminal of the amplifier 260 is electrically coupled to the controller 16 via the conductor 284. During operation, the amplifier 254 receives the voltage (Ec) from the coil 234 and outputs an amplified voltage (G*Ec) on the conductor 280 and an amplified voltage (−G*Ec) on the conductor 282, where G corresponds to the predetermined voltage gain. The noise cancellation amplifier 260 outputs the voltage (Ec'), having less electrical noise than voltage (Ec), in response to receiving the voltages (G*Ec) and (−G*Ec). The voltage (Ec') which is indicative of the position of the rotor 90 is received by the controller 16.

Referring again to FIG. 1, the controller 16 is provided to control operation of the coring apparatus 12 and the hoist 14. In particular, the controller 16 generates control signals for controlling operation of the hoist 14 for positioning the rotary coring device 32 at predetermined depths within the wellbore 18. Further, the controller 16 generates control signals for controlling operation of the hydraulic control system 44 for orientating the coring tool 56 of the rotary coring device 32 within the wellbore 20 for acquiring a sidewall core. Further, the controller 16 generates control signals for controlling operation of the motor 50 utilized in the rotary coring device 32 for driving the rotary coring bit 130. Further, the controller 16 receives the position voltages (Ea') (Eb'), (Ec') from the position sensing system 54 and utilizes the position voltages for controlling operation of the motor 50.

The variable reluctance position sensor and the method for determining a position of rotating body provide a substantial advantage over other sensors and methods. In particular, the variable reluctance position sensor is electrically isolated from a motor and can generate position signals indicative of a rotational position of a motor rotor without substantial electrical noise from the motor. Further, the variable reluctance position sensor can generate accurate position signals of the rotor when operating at a relatively high temperatures (e.g., greater than 350 degrees Fahrenheit).

The above-described methods can be embodied in the form of computer-implemented processes and apparatuses for practicing those processes. In an exemplary embodiment, the method is embodied in computer program code executed by the computer or controller. The method may be embodied in the form of computer program code containing instructions embodied in tangible media, such as floppy diskettes, CD-ROMs, hard drives, or any other computer-readable storage medium, wherein, when the computer program code is loaded into and executed by a controller, the controller becomes an apparatus for practicing the invention.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. Unless defined otherwise, technical and scientific terms used herein have the same meaning as is commonly understood by one of skill in the art to which this invention belongs.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A rotary position sensor, comprising:
a rotatable member comprising a first non-magnetic body portion and a plurality of magnets; and
a stator assembly comprising a second non-magnetic body portion with an aperture therein for receiving the rotatable member, the stator assembly further comprising a plurality of coils, the plurality of coils configured to generate waveform signals indicative of a position of the rotatable member in response to rotation of the rotatable member.

2. The rotary position sensor of claim 1, wherein the plurality of magnets comprise rare-earth magnets.

3. The rotary position sensor of claim 1, wherein the first non-magnetic body portion is constructed from plastic.

4. The rotary position sensor of claim 1, wherein the second non-magnetic body portion is constructed from plastic.

5. The rotary position sensor of claim 1, wherein the first non-magnetic body portion of the rotatable member comprises an aperture extending from a first end of the first non-magnetic body portion into the first non-magnetic body portion, the aperture being configured to receive a portion of the rotating body for fixedly coupling the rotatable member to the rotating body.

6. The rotary position sensor of claim 1, wherein plurality of magnets are disposed equidistant from one another around an exterior region of the first non-magnetic body portion.

7. The rotary position sensor of claim 1, further comprising a computer configured to receive the signals from the plurality of coils and to generate a first plurality of signals based on the signals from the plurality of coils.

8. The rotary position sensor of claim 1, wherein the sensor is suitable for operation in a wellbore environment.

9. The rotary position sensor of claim 1, wherein the sensor is suitable for operation at temperatures greater than 350 degrees Fahrenheit.

10. The rotary position sensor of claim 1, wherein the rotatable member and the stator assembly are adapted for use with a coring apparatus in a wellbore.

11. A rotary position sensor, comprising:
a rotatable member comprising a first non-magnetic body portion and a plurality of magnets;
a stator assembly comprising a second non-magnetic body portion with an aperture therein for receiving the rotatable member, the stator assembly further comprising a plurality of coils, the plurality of coils configured to generate waveform signals indicative of a position of the rotatable member in response to rotation of the rotatable member; and
a housing comprising an interior region for enclosing at least a portion of the rotatable member and the stator assembly wherein the housing is constructed from aluminum and the housing comprises an alignment groove extending from an exterior surface of the housing inwardly into the housing, for positioning the housing.

12. A method for determining a position of a rotating body utilizing a rotary position sensor, the rotary position sensor comprising a rotatable member comprising a first non-magnetic body portion and a plurality of magnets, the rotary position sensor further comprising a stator assembly comprising a second non-magnetic body portion with an aperture therein for receiving the rotatable member, the stator assembly further comprising a plurality of coils, the method comprising:

rotating the rotatable member of the rotary position sensor in response to rotation of the rotating body member coupled to rotatable member, wherein the plurality of magnets on the rotatable member are rotated past the plurality of coils of the stator assembly of the rotary position sensor to induce an electro-magnetic force in each of the coils to generate waveform signals; and
measuring the waveform signals to determine the position of the rotatable member utilizing a controller.

13. A rotary position sensor, comprising:
a rotatable member comprising a first non-magnetic body portion and a plurality of magnets; and
a stator assembly comprising a second non-magnetic body portion with an aperture therein for receiving the rotatable member, the stator assembly further comprising a plurality of coils, the plurality of coils configured to generate waveform signals indicative of a position of the rotatable member in response to rotation of the rotatable member wherein the stator assembly further comprises a plurality of coil brackets, each coil of the plurality of coils being attached to a respective coil bracket of the plurality of coil brackets, the plurality of coil brackets being fixedly attached equidistant from one another to the second non-magnetic body portion.

14. The rotary position sensor of claim 13, wherein the plurality of coil brackets are constructed from carbon steel.

15. A core extraction system for extracting a core from an earth formation, the core extraction system comprising:
a drilling device used for extracting the core; and
a system for controlling the drilling device, the drilling device comprising a rotating body, comprising:
a position sensor comprising a rotatable member and a stator assembly, the rotatable member being operably coupled to the rotating body, the rotatable member comprising a first non-magnetic body portion and a plurality of magnets, the stator assembly comprising a second non-magnetic body portion configured to receive the rotatable member, the stator assembly further comprising a plurality of coils configured to generate waveform signals indicative of a position of the rotatable member in response to rotation of the rotatable member; and
a controller operably communicating with the position sensor, the controller configured to control operation of the drilling device based on the signals of the position sensor.

16. The system of claim 15, wherein the plurality of magnets comprise rare-earth magnets.

17. The system of claim 15, wherein the first non-magnetic body portion is constructed from plastic.

18. The system of claim 15, wherein the position sensor is suitable for operation at temperatures greater than 350 degrees Fahrenheit.

19. The system of claim 15, wherein the second non-magnetic body portion is constructed from plastic.

* * * * *